Feb. 7, 1939.  G. A. KAUFMAN  2,146,581
METHOD AND APPARATUS FOR CLASSIFYING METAL SHEETS
Filed Nov. 12, 1934  13 Sheets-Sheet 2
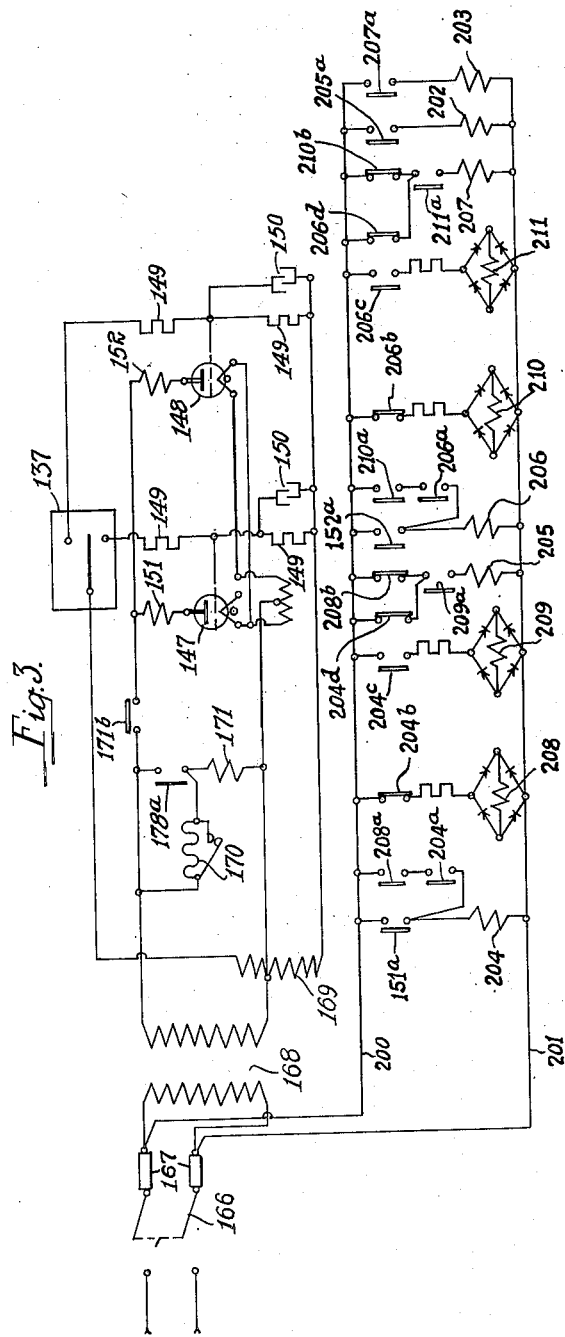
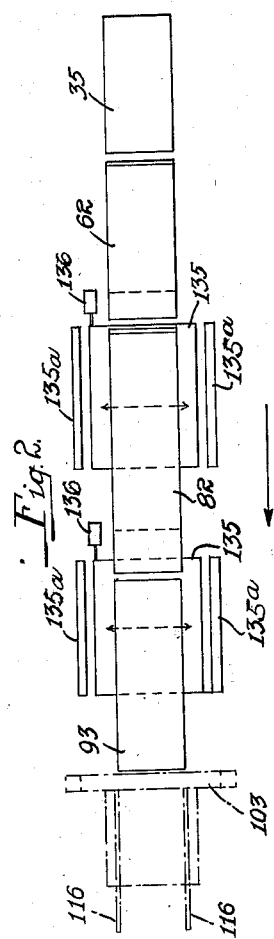
INVENTOR
George A. Kaufman
By Green & McCallister
His Attorneys Feb. 7, 1939.　　　　G. A. KAUFMAN　　　　2,146,581
METHOD AND APPARATUS FOR CLASSIFYING METAL SHEETS
Filed Nov. 12, 1934　　　13 Sheets-Sheet 8

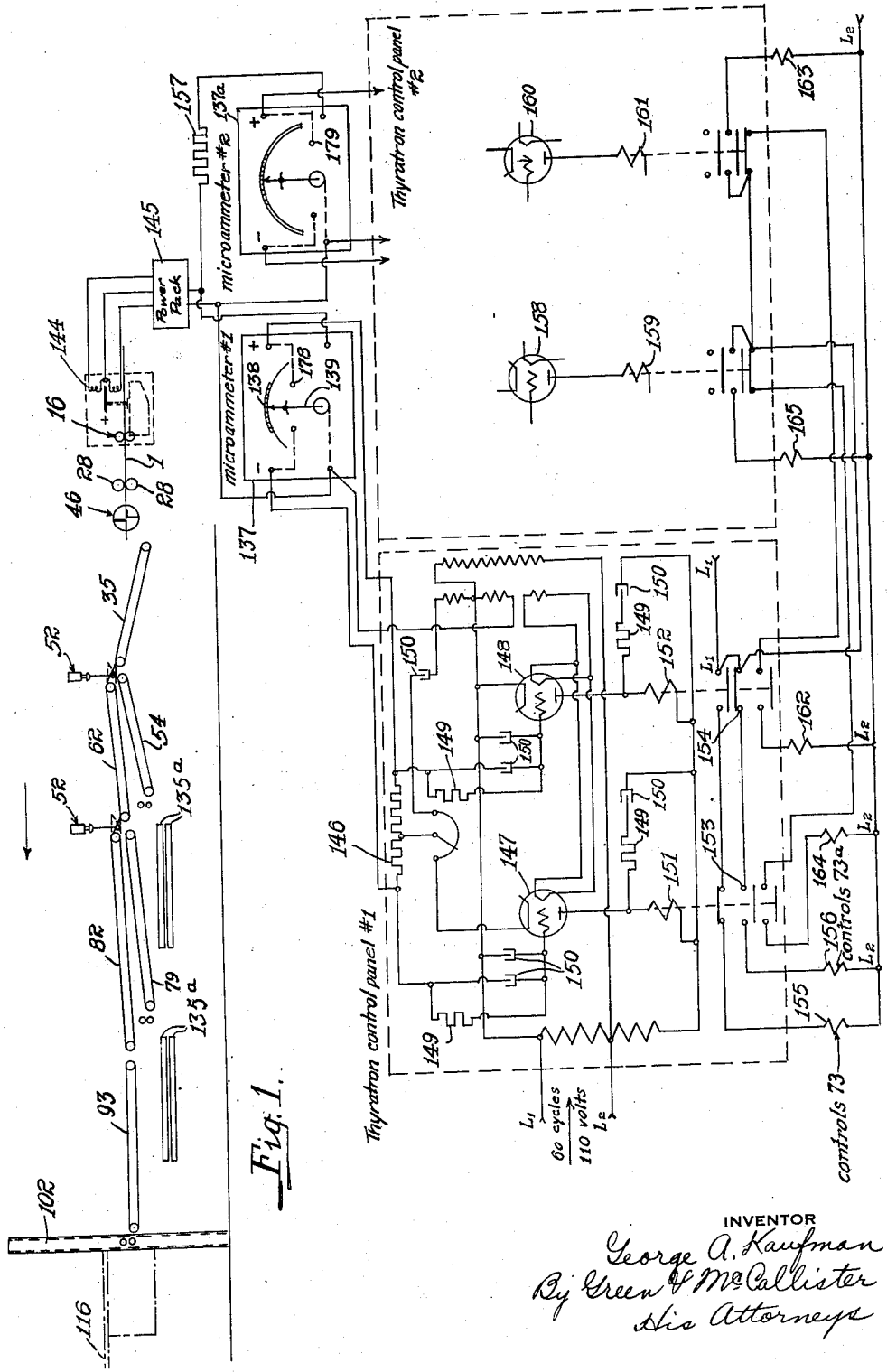

INVENTOR
George A. Kaufman
By Green & McCallister
His Attorneys

Feb. 7, 1939. G. A. KAUFMAN 2,146,581
METHOD AND APPARATUS FOR CLASSIFYING METAL SHEETS
Filed Nov. 12, 1934 13 Sheets-Sheet 9

INVENTOR
George A. Kaufman
By Green & McCallister
His Attorneys

Feb. 7, 1939.  G. A. KAUFMAN  2,146,581
METHOD AND APPARATUS FOR CLASSIFYING METAL SHEETS
Filed Nov. 12, 1934  13 Sheets-Sheet 12

INVENTOR
George A. Kaufman
By Green & McCallister
His Attorneys

Feb. 7, 1939. G. A. KAUFMAN 2,146,581
METHOD AND APPARATUS FOR CLASSIFYING METAL SHEETS
Filed Nov. 12, 1934 13 Sheets-Sheet 13

INVENTOR
George A. Kaufman
By Green & McCallister
His Attorneys

Patented Feb. 7, 1939

2,146,581

UNITED STATES PATENT OFFICE 2,146,581

METHOD AND APPARATUS FOR CLASSIFYING METAL SHEETS

George A. Kaufman, Beaver, Pa., assignor to Jones & Laughlin Steel Corporation, a corporation of Pennsylvania Application November 12, 1934, Serial No. 752,792

31 Claims. (Cl. 209—88)

This invention relates to the classifying of metal sheets or plates according to their gage or weight characteristics and more particularly comprehends an automatic method and apparatus for segregating metal sheets or plates of like or similar gage or weight characteristics in individual stacks or piles.

Prior known schemes of classification of metal sheets or plates have been essentially or substantially manual. According to prior practice, a strip of metal is sheared into suitable sheets or plates and delivered to a stack or pile without regard to the characteristics of the individual sheets or plates, and then the sheared sheets are manually, mechanically or pneumatically classified. Since rolling operations for producing such strip are as yet incapable of producing an entire strip which is uniform in gage without varying beyond permissible tolerance limits, it has been necessary to gage or weigh (weight being a direct function of gage) the individual sheared sheets or plates and to thus classify them. According to one practice, a suitable number of workmen manually weigh or gage each individual sheet and then manually place them in a stack or pile. Other practices attempt automatic weighing or pneumatic classification of the sheets or plates. These methods are not only slow and comparatively expensive but are necessarily appreciably inaccurate due not only to the human factors involved, but due furthermore to the limitations of time and equipment which more or less preclude division of the sheets or plates into stacks or piles which are very nearly uniform as to gage or weight characteristics. While such practices have been more or less exclusively followed in the past the inherent limitations and disadvantages of such have long been apparent to those concerned with this field of endeavor.

Some attempts have been made in the past to classify sheets or plates automatically but these have either failed to provide the requisite accuracy and speed or they have been unduly complicated and hence impractical. Such methods as I am aware of attempt to classify the sheets and plates after they are sheared and piled and this means relatively complicated apparatus for picking the sheets up individually by means of suction apparatus and attempting to automatically weigh each sheet. There has been no simple, direct, efficient method and apparatus developed to my knowledge which gives sufficient promise for practical commercial use other than that herein disclosed by me.

It is accordingly one of the objects of my present invention to automatically, rapidly and accurately classify metal sheets or plates in a comparatively simple and efficient manner.

Another object of my invention resides in continuously and automatically gaging a strip of material prior to shearing it into sheets or plates and then in effecting automatic classification rapidly and within narrow adjustable tolerance limits in accordance with the gage characteristics.

An additional object of my invention resides in the provision of a combination between a multi-path conveyor and an associated gaging device, the two being electrically interrelated and the former being controlled by the latter.

A further object of my invention lies in the provision of a conveyor system which has electrically controlled means for causing sheets or plates to take a predetermined path of a number of possible paths through the conveyor system in combination with a continuous gaging device operating upon a strip prior to shearing it into such sheets or plates and an electrical system connecting such gage and those portions of the conveyor system which determine the path of travel of any individual sheet or plate.

A still further object of my invention resides in continuously and automatically gaging a strip of material as it is fed to a shearing and conveying system, in shearing the strip into sheets or plates and, in accordance with the gage characteristics of the individual sheets or plates, causing sheets or plates to follow paths of travel according to their gage characteristics so as to directly classify the plates or sheets as they are sheared into stacks or piles of very closely the same gage characteristics.

The apparatus for stagger piling metal sheets disclosed herein is claimed in my copending application Serial No. 50,798, filed November 20, 1935.

Other and further objects and advantages reside in the various combinations, subcombinations and details to be hereinafter described and claimed and in such other objects and advantages as will be understood by those skilled in this art.

In the accompanying drawings wherein similar numerals designate corresponding parts in the various views:

Figure 1 is a schematic side elevational view of a classifying apparatus with one form of associated electrical system for securing the objects and advantages of the present invention shown diagrammatically;

Fig. 2 is a schematic plan view of that portion of Fig. 1 relating to the conveyor system;

Fig. 3 is an elementary electrical wiring diagram illustrating another circuit which can be used like that of Fig. 1;

Fig. 15 illustrates a vertical cross-section through the rolls, belts and deflector at the first classifying station of the apparatus and indicates in dotted lines the shearing device;

Fig. 16 is a view similar to Fig. 15 without the shearing device at the second classifying station of the apparatus.

Figure 4:
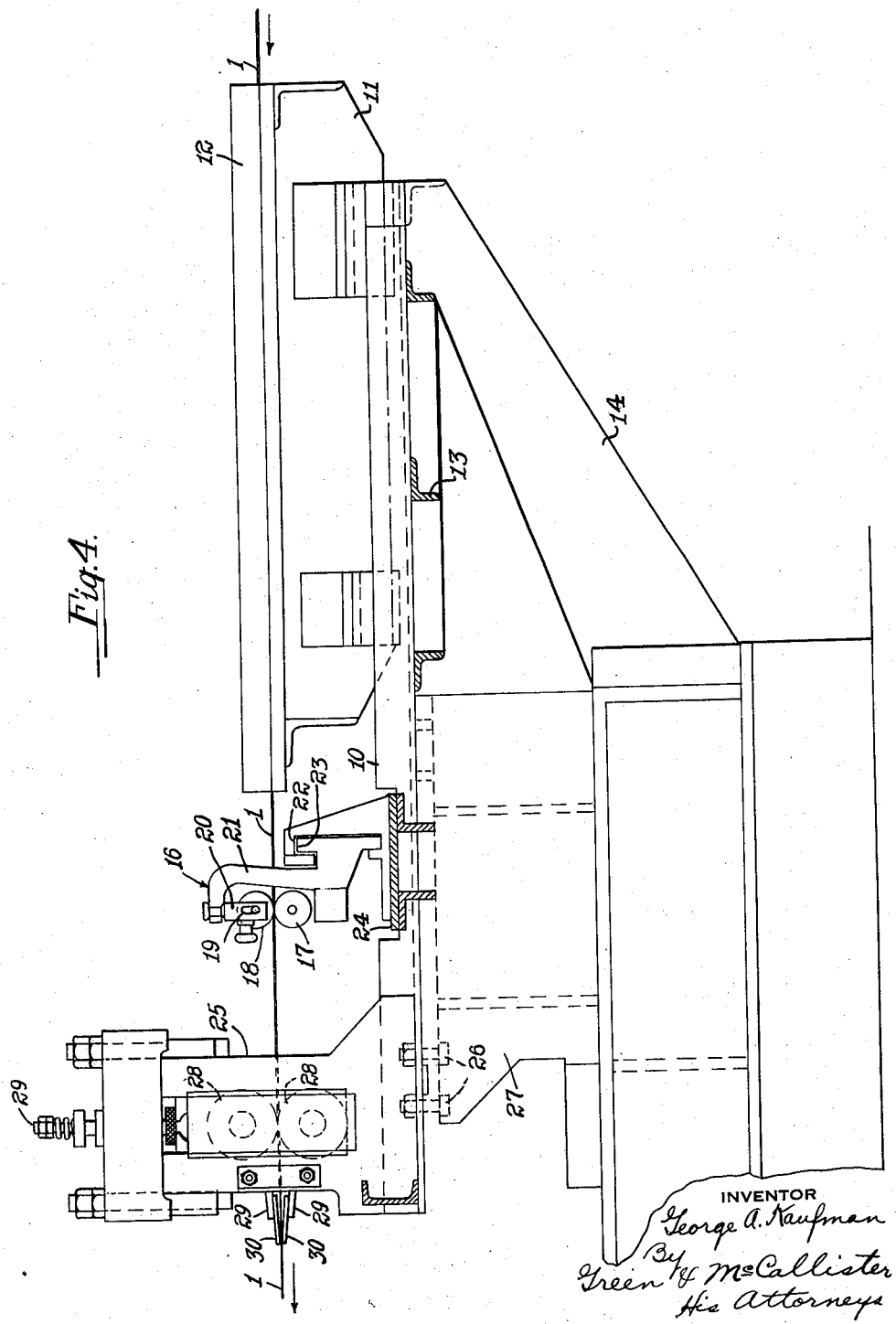
Fig. 4 is a side elevational view, with parts in section, of the rear section of the mechanical apparatus utilized in a preferred form of the invention.

In describing the apparatus, I shall start at the rear end thereof and work forwardly as I believe that this will provide a clearer and more logical explanation following, so to speak, the course which the material follows. At the rearward end of the apparatus there is a suitable framework 10 upon which is provided a suitable receiving platform 11 having raised sides 12 and upon which the strip of material 1 is placed. Suitable cross braces 13 and angular struts 15 give the desired strength and rigidity. Forwardly of this framework is a continuous gaging device 16 which may be, for example, that known as a Pratt & Whitney "Electrolimit" gage shown in somewhat exaggerated form for clarity. The gage 16 is provided with a pair of gaging rolls the lower of which 17 may be fixed and the upper of which 18 may be "floating" or variable as to position in a slot 19 of hanger 20 so that it can rise and fall to the desired extent in accordance with the thickness of the strip 1 passing between the gage rolls. It is only necessary that the gage rolls be relatively movable so as to accurately vary their relative distance apart in accordance with gage variations of the strip. The gaging rolls are, of course, mounted in a suitable head or standard 21 and as shown in Fig. 1, for example, the rolls are connected into an electrical system to be hereinafter described. The head or standard 21 of this gage is configured so as to be slidable in the slideways 22, the gage standard 21 having a projection 23 adapted for this purpose. The whole gage is suitably mounted on a suitable framework 24 and is preferably provided with rubber inserts (not shown) to minimize transmission of vibrations to the gage.

Stationed forwardly of the gage 16 is a roll stand designated in general by the numeral 25 and which is suitably mounted as by bolts 26 to a suitable base or support member 27 which is common both to the roll stand and to the gage. Suitably mounted in any known manner in the roll stand is a pair of driven rolls 28 through which strip 1 is fed. The pressure of these rolls on the strip may be varied by the adjusting assembly indicated in general by the numeral 29, the details of which are well known and form no part of the present invention. After the strip passes through these rolls 28 they are threaded through a throat. This throat is constructed of two heavy metal plates 29 so mounted on the roll stand at an inclination to the horizontal that they form a tapering passageway from the roll stand on the center line of the pass between the rolls, and soldered, brazed or otherwise suitably secured to these plates 29 are brass plates 30 which are also mounted to provide a tapering passageway and which at the forward end thereof approach the thickness of the strip in their spacing. The rolls 28 may be suitably driven in any desired or known manner and act as feed rolls.

Figure 5:
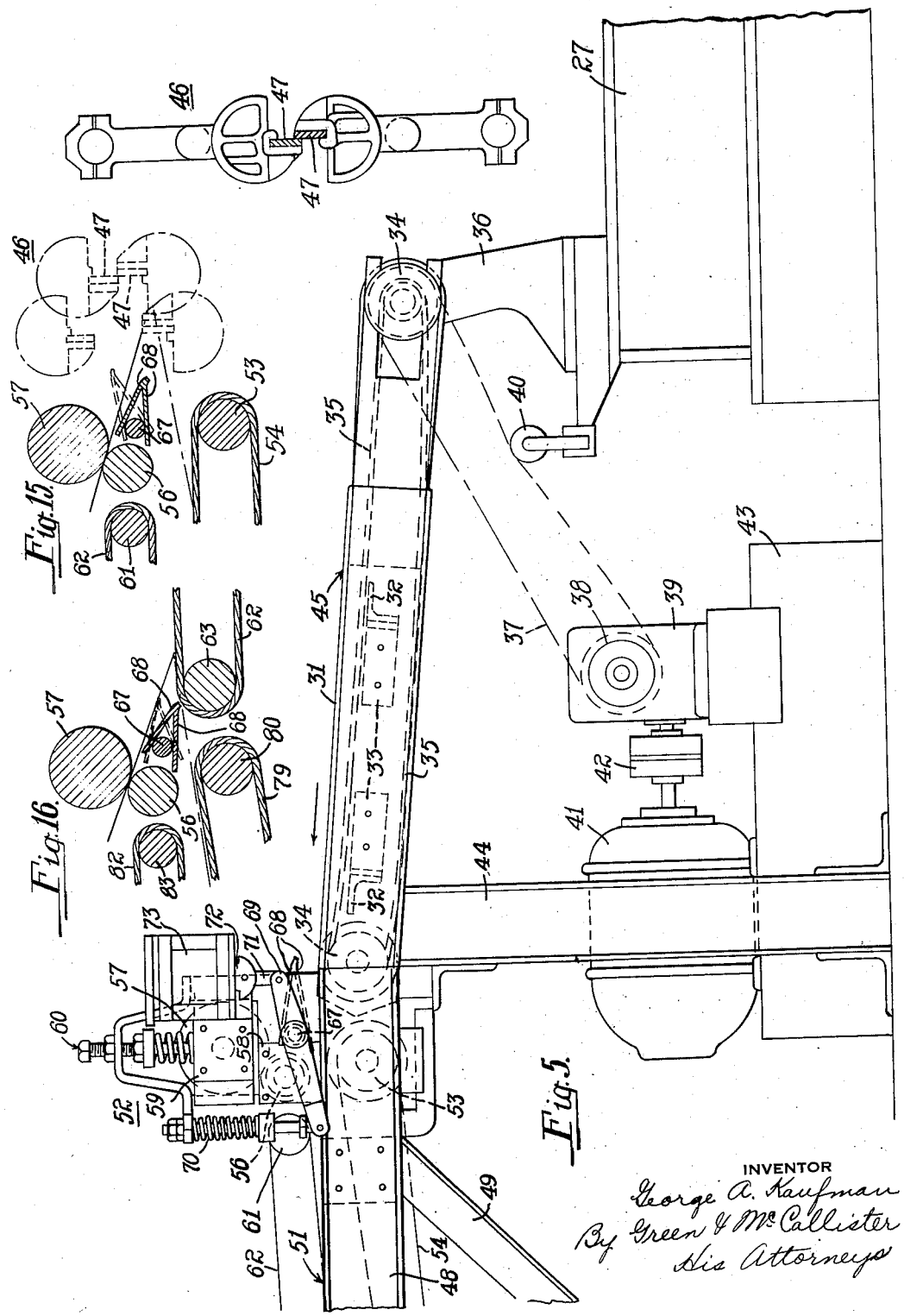
Fig. 5 is a continuation of the apparatus of Fig. 4 and shows in side elevation the next forward portion thereof.
Figure 10:
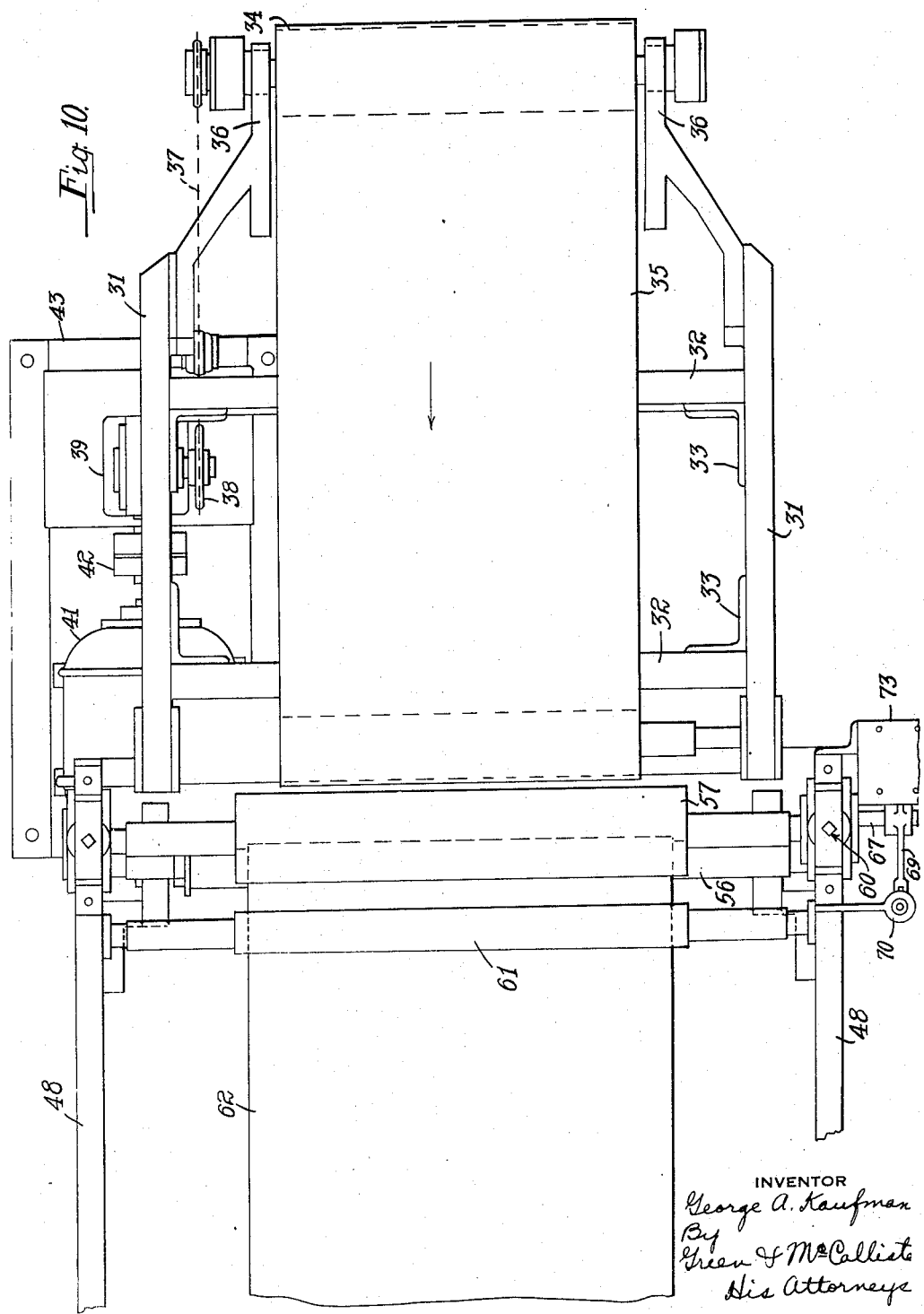
Fig. 10 is a plan view of that portion of the apparatus shown in Fig. 5 and is a forward continuation of Fig. 9.
Figure 11:
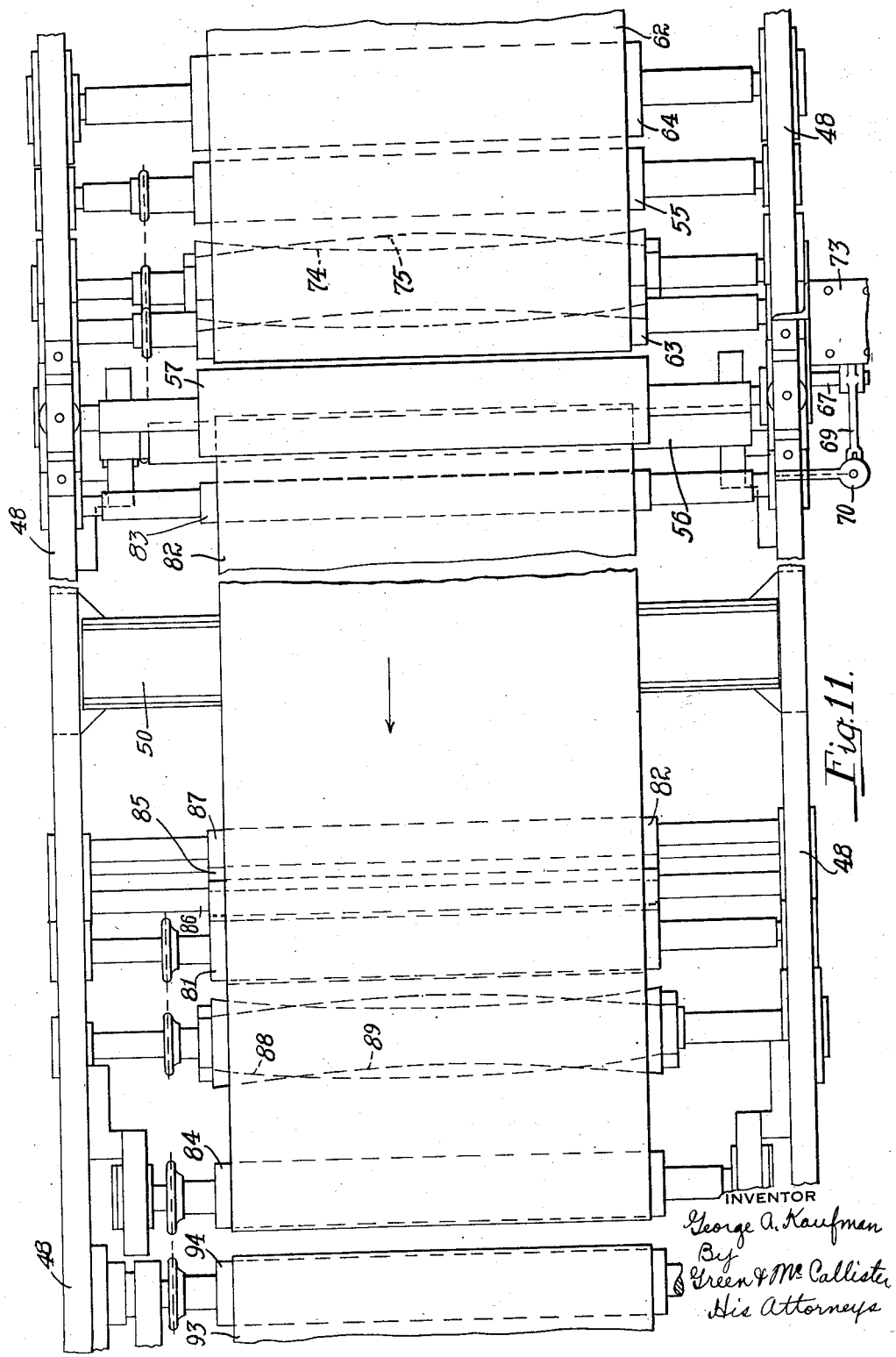
Fig. 11 is a plan view of Figs. 6 and 7, with certain intermediate portions omitted and is a forward continuation of Fig. 10.

As shown in Figs. 5 and 10, the next forward portion of the apparatus consists of a conveyor section and as will be hereinafter more fully understood this conveyor section is common to the various possible paths of travel through the conveyor system and hence is hereinafter termed a common conveyor section. This common conveyor section designated in general by the numeral 45 is made up of inclined metal side beams 31 secured together by cross-braces 32 which are suitably fastened in place at their ends to the inclined beams as by securing plates 33. At each end of this conveyor section is a roll 34 journalled in suitable bearings which are secured to the inclined beams and extending practically the full width of the apparatus. Around these rolls is a suitable endless conveyor belt 35 made of rubber or of any other suitable material. The rearward roll 34 of the two is mounted on a suitable support 36 which in turn is mounted on the forward end of the common support 27 beneath the gage and roll stand. For the purpose of driving this endless conveyor belt a suitable chain, belt or the like 37 passes therearound (a suitable gear on roll 34 being provided when a chain is used) and also around a driving pulley or wheel 38 mounted in a suitable support 39. The proper degree of tension is maintained on this chain or belt by means of the idler roll 40. The driving pulley or wheel is driven by means of a motor 41 acting through a coupling 42. The motor 41 and support 39 are supported by a suitable base 43. The forward end of the common conveyor section is supported by vertical beams 44.

Suitably positioned between the roll stand 25 and the common conveyor section 45, just described, is a flying shear designated in general by the numeral 46. This flying shear is of well known construction and is suitably mounted and driven in such manner that as the shear blades 47 approach cutting position they are travelling at the same rate of speed as the strip 1. In this manner, without stopping the strip, the strip is sheared into sheets or plates as it leaves the roll stand 25 and its associated throat. If I so desire, the travel of the strip could be controlled by a suitable movement of the Geneva type applied to rolls 28 and in such case the strip would be stopped periodically for a very brief period of time during which it could be cut by a stationary shear if so desired.

Forwardly disposed with relation to the common conveyor section 46 above described, the framework of the apparatus continues in a substantially horizontal position and is made up of longitudinal metal side beams 48 supported at their rear by the vertical beams 44 and braced by angular beams 49 and cross-beams 50. This section is designated as a whole by the numeral 51. At the rearward terminus of this next forward conveyor section 51 and just forwardly of the common conveyor section 45 is arranged a first deflecting station 52. It is apparent from Fig. 1 in particular that located forwardly of this first deflecting station 52 are two conveyor sections, one inclined downwardly to a material extent and one inclined downwardly only slightly. Suitably mounted in the framework 48 in conveyor section 51 aforesaid is a roll 53 extending across the apparatus and suitably journalled in bearings attached to the framework and which serves for the reception of endless conveyor belt 54, which also passes around a roll 55 (Fig. 6).

Suitably mounted in bearings 58, 59 mounted on framework extending upwardly from the beams 48 are a pair of pinch rolls 56, 57 of suitable size and configuration and the upper (57) of which, as shown in Fig. 5, may be adjusted to vary the pressure upon material passing between the rolls. The adjusting mechanism is well known and is designated by numeral 60. Slightly forwardly of the lower pinch roll is a roll 61 which receives conveyor belt 62 which, as shown in the right hand portion of Fig. 6, travels slightly downwardly and passes around a roll 63 suitably journalled and mounted. To maintain proper tension on the belt it may be caused to pass, after its passage around roll 63, over a roll 64 and under another roll 65, either or both of which being adjustable as to position for the purpose of maintaining the desired degree of tautness in the belt. Roll 64 is journalled in bearings 65 and is shown to be adjustable as to vertical position by means designated as 66. As will be clear from Fig. 15, in particular, approximately over the roll 53 is a shaft 67 which extends across the apparatus and is suitably journalled and supported. Soldered, welded, or otherwise secured to this shaft are the two brass plates 68 arranged as shown so that they form a V the lower plate of which is more or less horizontally disposed in its normal full line position (Fig. 15). It is apparent that such V in this way provides two guiding surfaces for the sheared sheets or plates coming from the common conveyor section 45. This V is so disposed that when in the full line position of Fig. 15 it directs or deflects the sheets or plates between the pinch rolls 56, 57 and hence onto conveyor belt 62, the pinch rolls being suitably driven in any desired manner. When in the dotted line position of Fig. 15, sheets or plates are deflected by the lower surface of the V onto conveyor belt 54. This will be more fully explained hereinafter.

From Fig. 5 it will be apparent that one end of shaft 67 is provided with a lever 69. The forward end of the lever 69 is connected to a strong spring 70 suitably mounted. The rearward end of the lever 69 is connected through a short link 71 to a solenoid core 72 extending upwardly within the solenoid casing 73 which is suitably electrically wound in known manner. It is thus apparent that when the solenoid 73 is energized by the passage of current through its windings it draws up into it solenoid core 72 and thus through link 71 and lever 69 imparts a small amount of rotation to shaft 67 which accordingly serves to alternately raise the V of Fig. 15 into its dotted line position and then to allow it to move back to full line position when the current is off and the solenoid is deenergized. When the V is in the dotted line position of Fig. 15 the sheets or plates are deflected onto conveyor belt 54 and when they arrive at the lower forward end of this belt as seen in Fig. 6 they then pass between a set of pinch rolls 74, 75 similar to the pinch rolls already described and the lower of which is mounted in bearings 76 and is movable or yieldable (and adjustable) against spring and bolt assembly 77. After passing through these pinch rolls the sheets or plates are discharged onto a truck 78.

Figure 6:
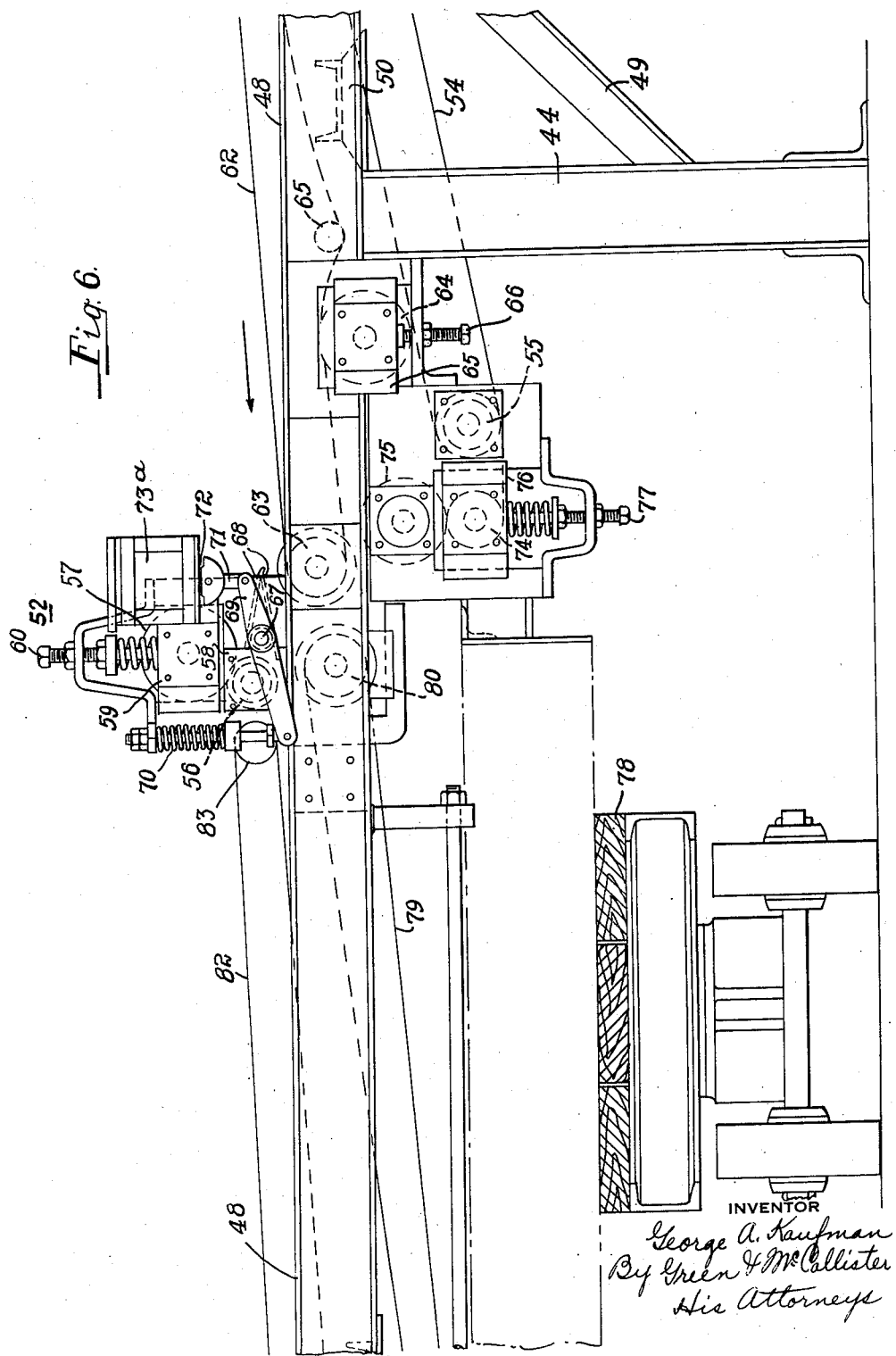
Fig. 6 is a continuation of Fig. 5 and shows in side elevation the next forward portion of the apparatus.
Figure 7:
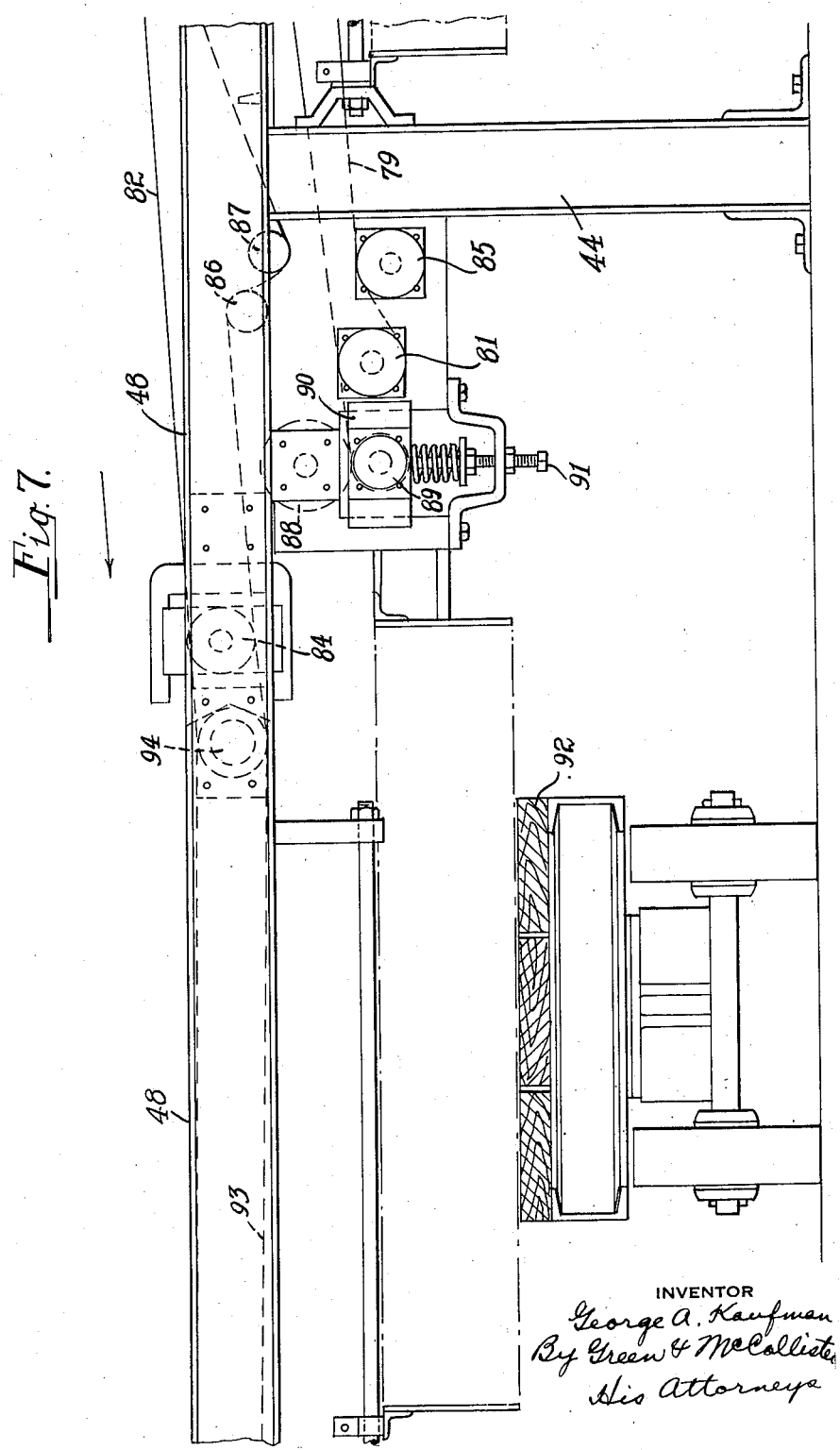
Fig. 7 is a continuation of Fig. 6 and shows in side elevation the next forward portion of the apparatus to Fig. 6.

Arranged in a forward continuation of the framework beams 48 is a second deflector station as shown in Fig. 6 and designated as a whole by the numeral 52. This needs no detailed description because it is the same as the deflector station 52 already described in connection with Fig. 5 and the use of the same numerals on the deflector station parts in Fig. 6 indicates that the parts are in fact the same. As at the first deflector station, two conveyor belts are arranged forwardly of the second deflector station whereat, as will hereinafter be more fully appreciated, sheets or plates can be caused to travel either along conveyor belt 79 passing around rolls 80, 81 or along conveyor belt 82 passing around rolls 83, 84. Endless conveyor belt 79 passes over roll 85 (Fig. 7) after leaving roll 81 to keep the belt in proper position and condition. Endless conveyor belt 82 is kept in proper position and condition by passing over a suitable roll such as 86 and then under a closely adjacent roll 87. In the same way as at the first deflector station when the V is in its dotted line position as in Figs. 1 and 16, the sheets or plates from conveyor belt 62 are caused to travel downwardly along conveyor belt 79 through a set of pinch rolls 88, 89 the lower (89) of which is mounted in bearings 90 and yields against a spring and bolt assembly 91 and hence to another truck 92 which receives the same. The mechanical features and arrangement with respect to the second deflector station are the same as at the first deflector station and hence the same numerals have been used to indicate the correspondence of parts.

When the V at the second deflector station is in its full line position as in Figs. 1 and 16 the sheets or plates from conveyor belt 62 are caused to travel through a set of pinch rolls 56, 57 and hence onto conveyor belt 82 from which they pass to conveyor belt 93 also mounted like the preceding conveyor belt on rolls 94, 95 suitably journalled and mounted in a forward continuation of the framework beams 48. Belt 93 passes over yieldable roll 96 mounted in bearings 97 and working against spring and bolt assembly 98.

Figure 8:
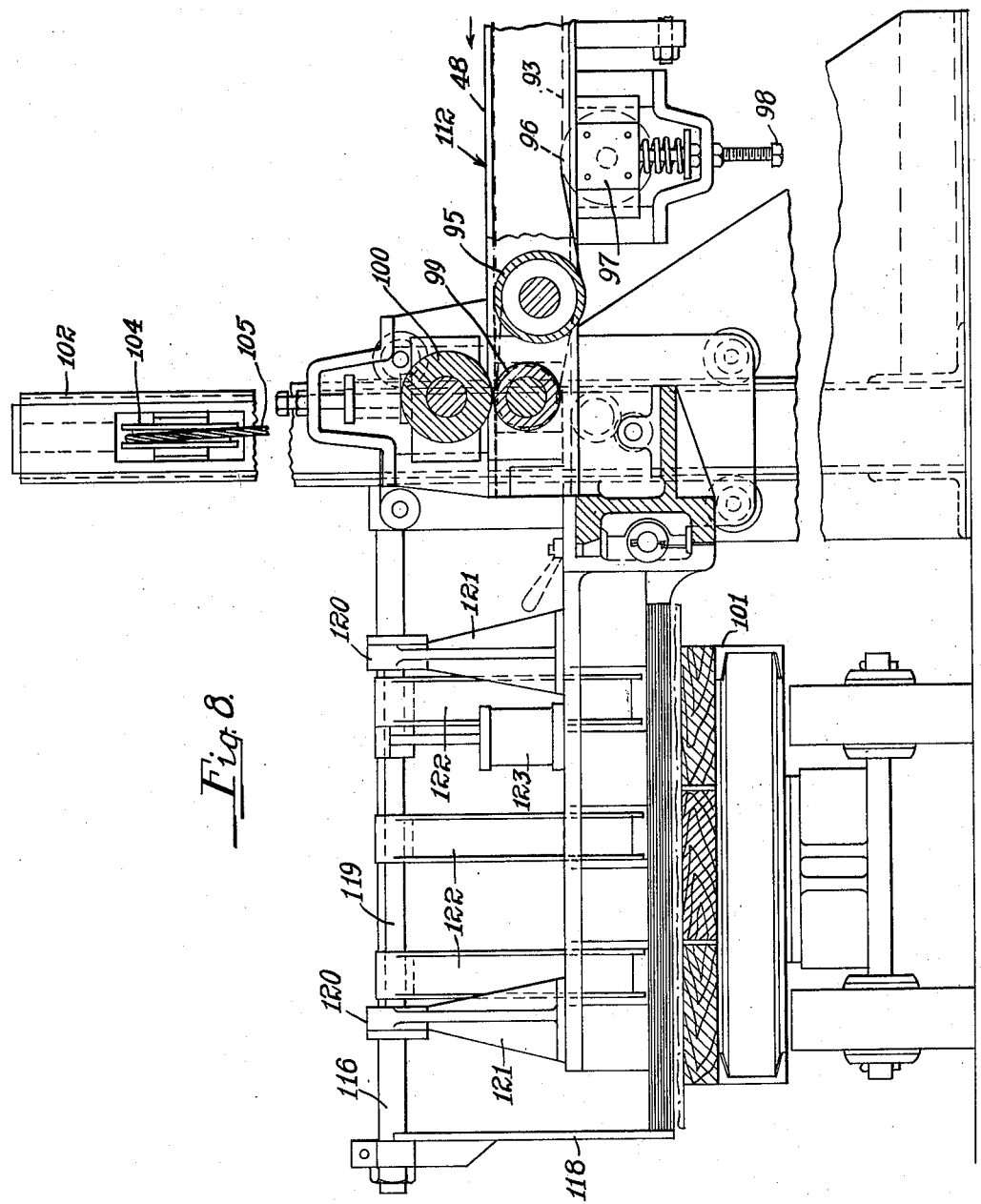
Fig. 8 is a continuation of Fig. 7 and shows in side elevation with parts in section the forward end of the apparatus and the stagger-piler.
Figure 9:
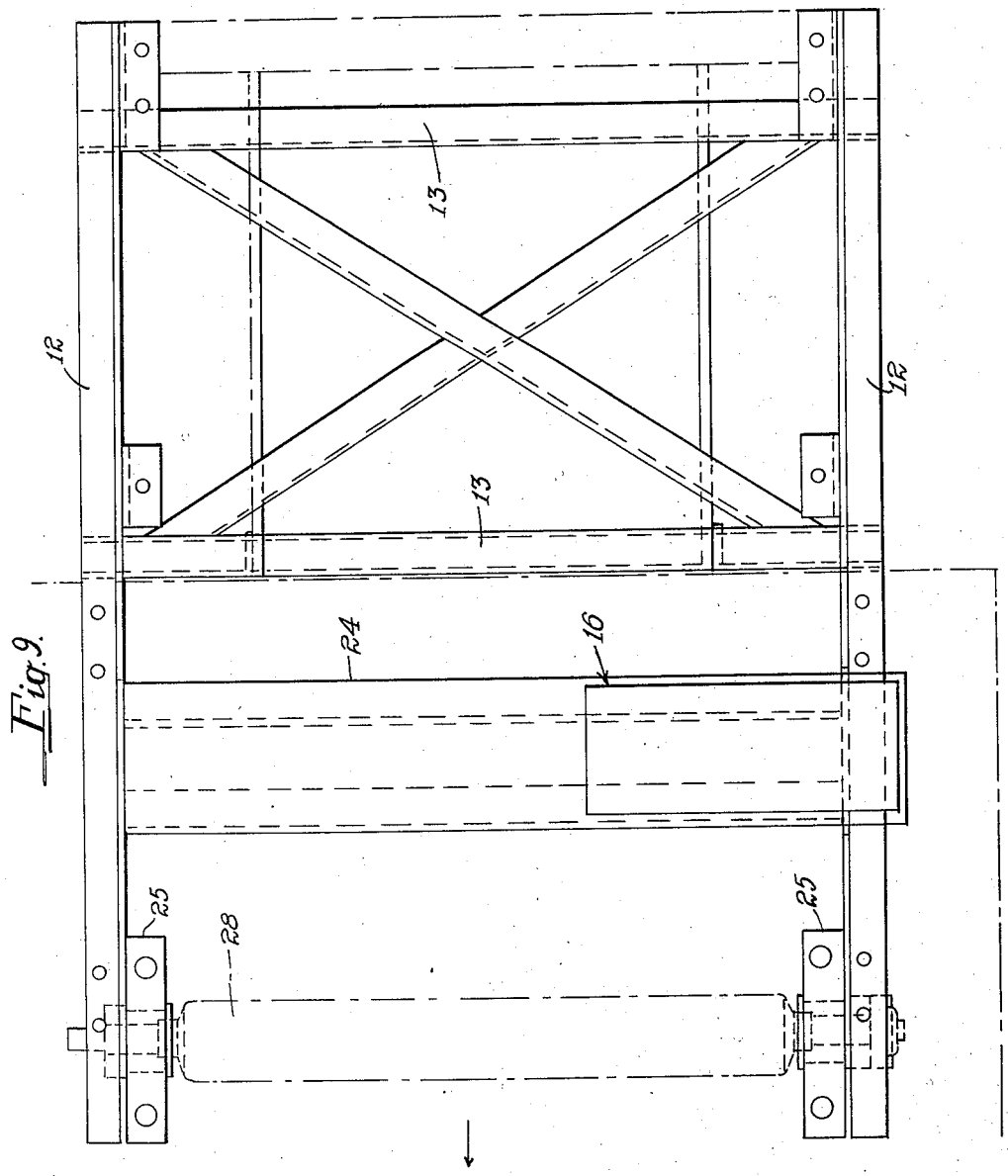
Fig. 9 is a plan view of that portion of the apparatus shown in Fig. 4.

As will be best understood from Fig. 8 in particular, when the sheets or plates received by conveyor belt 93, which is the most forward conveyor section, reach roll 95 in their travel they are discharged from the conveyor system between a pair of pinch rolls 99, 100 which are suitably mounted and driven. Sheets or plates received by pinch rolls 99, 100 are discharged onto receiving truck 101 where they pile up. It will be understood that the sheets or plates received by truck 101 are "O. K." sheets, that is, sheets which are within tolerance limits of the order being filled or within gage limits in accordance with the setting and adjustment of the apparatus.

Figure 12:
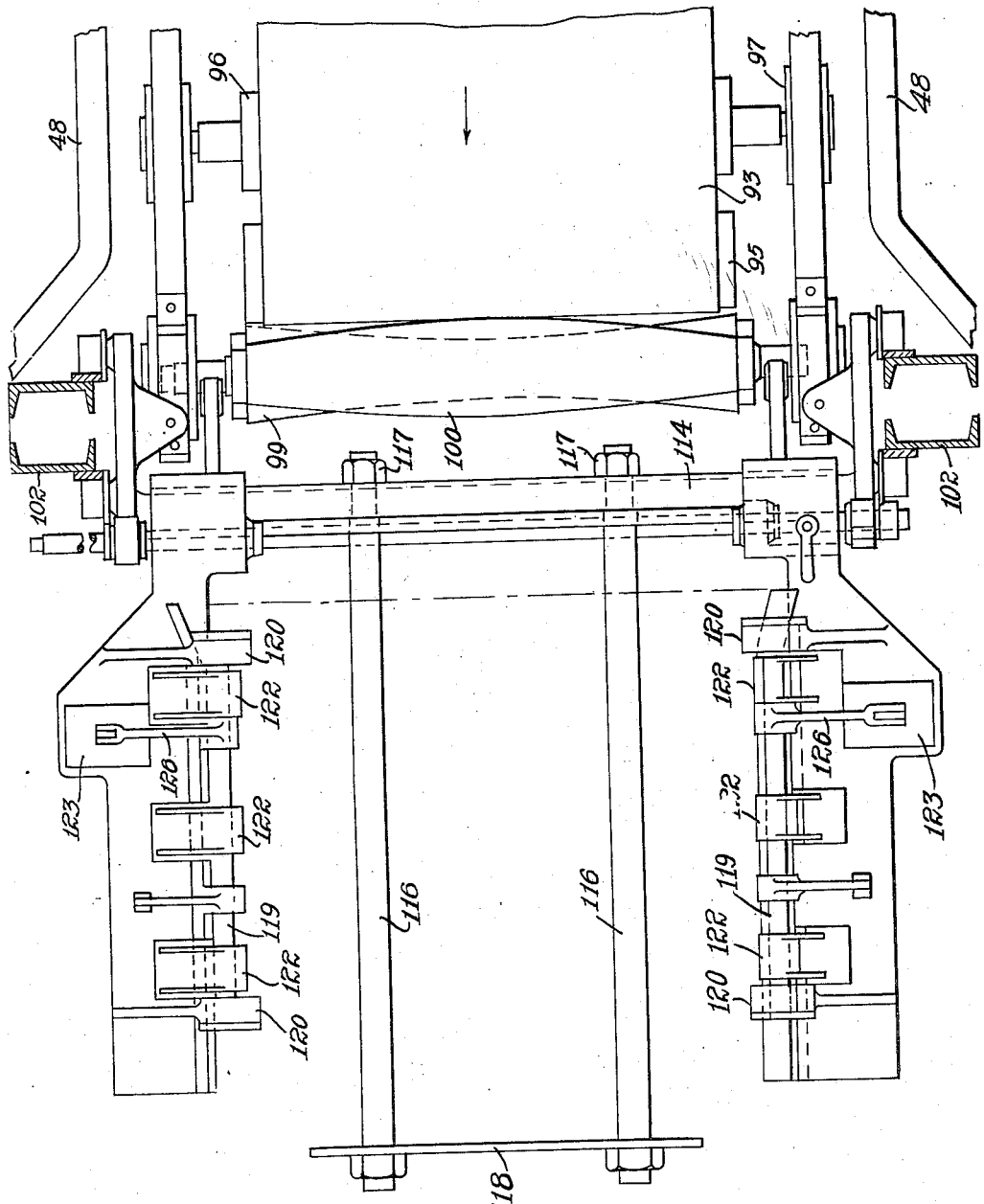
Fig. 12 is a plan view with parts in section of the forward end of the apparatus and stagger-piler disclosed in Fig. 8 and is a forward continuation of Fig. 11.
Figure 13:
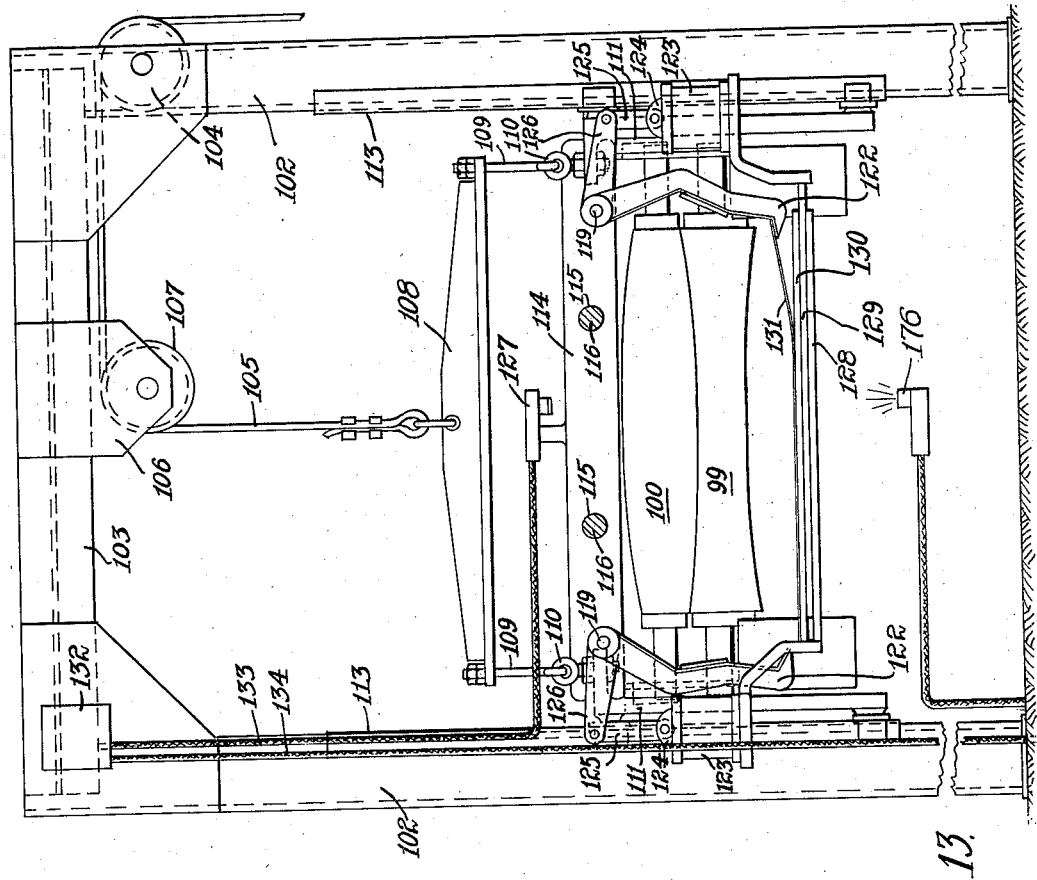
Fig. 13 is an end elevational view on a somewhat smaller scale looking toward the front of the apparatus and stagger-piler, that is, looking from the left of either of Figs. 8 or 12.

At this point in the apparatus there is, as shown in Figs. 8 and 13 particularly, a gallows construction consisting of vertical channel beams 102 which are connected at their upper ends by a cross beam 103. Suitably mounted in one of the vertical beams 102 is a sheave 104 over which a cable 105 passes. Also mounted on the cross beam 103 by means of a depending bracket 106 is another sheave 107 over which the cable 105 also passes. One end of this cable 105 is suitably connected to a cross head 108 which in turn, by means of metal hook and eye bolts 109, 110, is connected at each end to the slidable bearings 111 in which the pinch rolls 100, 99 are journalled. When these journals move up or down they carry therewith, as will be understood from Fig. 12, the forward end of the conveyor section 112, so that the inclination of this final conveyor is also changeable, the conveyor being fulcrumed suitably at its rearward end adjacent roll 94. The vertical beams 102 of the gallows construction are provided with associated slideways 113 so that by any suitable means as by a drum or worm gear the free end of cable 105 can be drawn in or slackened thus either raising or lowering member 108 and connected members and thus altering the position of roll 95 and the forward end of conveyor belt 93, so as to change the inclination of belt 93 and/or simultaneously to vary the pressure between the pinch rolls 99, 100.

Sheets or plates from conveyor belt 93 and discharged through pinch rolls 99, 100 are caused to form a stack or pile on truck 101 as already stated and such is suitably positioned to receive the same as shown in Fig. 8. As will be apparent from Figs. 8, 12 and 13, a cross bar 114 is provided extending approximately the full width of the apparatus and suitably secured to the framework thereof. This bar 114 is provided with spaced holes 115 through which pass the rearward ends of rods 116 which are maintained in place by means of nuts 117. The forward ends of these rods 116 have suitably depending therefrom a stop plate 118 which prevents the forward movement of the sheets from causing them to travel too far and at the same time causes them to pile up abutting this stop plate so that the forward edges thereof are aligned.

Disposed along the sides of this portion of the apparatus and in parallelism with the rods 116 aforesaid are shafts 119 rotatably mounted at each end in bearings 120 and maintained in position by triangular shaped supports 121. Depending at spaced points from these shafts are mechanical fingers 122, three on each shaft being shown, although the number may, of course, be varied to suit circumstances. Associated with each of these shafts is a solenoid casing 123 of the same general type as that hereinabove described at 73 in connection with each of the deflecting stations. These solenoids have movable cores 124 which are drawn within the solenoid casings when the windings thereof are energized. A short link 125 connects each solenoid core with an arm or lever 126 to one end of which the short link is connected and the other end of such arm or lever being fastened to one of the shafts 119. These mechanical fingers have two possible positions, a retracted position (at the left of Fig. 13) and an advanced position (at the right of Fig. 13). The fingers are so constructed and mounted that one set of fingers is in advanced position while the other set is in retracted position. Looking at Fig. 13, for example, it will be seen that the fingers at the left of the view are retracted while those at the right are advanced. The solenoids and hence the positions of the mechanical fingers are controlled by a suitable associated electrical circuit which can be rendered operative or inoperative independently of the classification apparatus.

Mounted upon the bar 114 is an electric eye installation 127 which is connected into the electrical circuit controlling the mechanical fingers. The purpose of the mechanical fingers, as will be understood from an inspection of Fig. 13, in particular, is to pile the sheets discharged from conveyor belt 93 through pinch rolls 99, 100 in groups, each group being offset or staggered from the preceding group. The numerals 128, 129 130 indicate three such groups of sheets which have been stagger-piled, as it is called, and the mechanical fingers at the right of Fig. 13 are shown to be receiving the first sheet 131 of a new group of sheets which will be piled in the same manner as the second group of sheets 129 are already shown to be piled. An electrical counting device which may be a notched or segmented switch element operatively associated with said electric eye installation determines how many sheets are included in each group of sheets and when this counting device reaches the pre-set number, i. e., 8, the electric eye causes current to flow through the solenoid circuit this energizing the solenoids and retracting whichever mechanical fingers are in the advanced position and as these fingers retract they draw the sheets with them a short distance due to friction and to the angle of the base of the fingers so that they are dropped in the manner shown and as the fingers on one side retract, those on the other side advance to receive the next group of sheets. As stated the number of sheets to a group can be predetermined by means of a suitable electrical control device which may cause the electric eye installation to energize the solenoid circuit after any given number of sheets have passed the electric eye installation. While this number for convenience in the present installation can be set from 1 to 10, 8 is the most commonly used number, but, of course, the counting device can be arranged to count any desired number of sheets. The forward end of the classifying apparatus, therefore, can be at will converted into a stagger-piler as it is called in the industry, but as stated, this may be either used or not used, as desired, and if not used the sheets pile up uniformly and can be removed at desired intervals by wheeling out the truck and substituting a new truck. 132 is a suitable control box mounted on the gallows construction. 133 and 134 are suitable electrical cables.

As described above, the classifier will discharge sheets or plates into three separate piles or classifications. I may, however, increase the number of classifications to five and such an arrangement is shown schematically in Figs. 1 and 2. Instead of discharging sheets from conveyor belts 54 and 79 onto trucks as heretofore described these sheets may be deposited upon reversible cross conveyors 135, driven in either direction by motors 136, as indicated by the double headed arrows in Fig. 2. In such case, it being understood for the sake of simplicity of description that conveyor belt 54 handles over-gage sheets and conveyor belt 79 handles under-gage sheets, the over-gage sheets and likewise the under-gage sheets are deposited upon such reversible conveyor which breaks up each of these classifications into two classifications, e. g., heavy and extra heavy gage and light and extra light gage. In each case the reversible conveyor is connected into the "Electrolimit" gage circuit through timed relays such that automatically the reversible conveyor is caused to travel in the appropriate direction depending upon whether the material is heavy or extra heavy in the case of the first deflecting station and depending upon whether the material is light or extra light in connection with the second deflector station. From these reversible conveyors the further classified sheets are passed on either side through sets of pinch rolls 135a and deposited upon suitable trucks where they are discharged. In this manner five classifications can be readily secured and if I so desire, and this I deem to be also a part of my invention, I may utilize a classifying scheme as above described at each end of each of the cross conveyors so that I can produce any number of classifications desired or required according to circumstances. Any such classifications can also be stagger-piled as will be understood.

Before describing the electrical circuit, it will be well at this point to summarize the operation of the device since the electrical system is essentially an actuating and controlling means for carrying out the method and for operating the apparatus. Let it be assumed that an order for sheets calls for a gage thickness of approximately .0105 inch. Due to the fact that strips of material prepared for shearing into sheets, no matter how carefully rolled, always vary along their entire length as much as .002 or .003 inch or more, it is certain that parts of the strip will not conform to the requirements of the order.

Let it be further assumed that the tolerance limits on this particular order are .0005 inch either way. Therefore, the apparatus will be so set mechanically and electrically that all sheets between the limits of .010 inch and .011 inch will be passed along the conveyor and will be discharged at the end where the stagger-piler is located and which latter may be in operation or not as preferred or required. Frequently, a material part of the strip is outside of these limits of .010 to .011 inch and if such sheets were intermingled with the order this would cause rejection or unsatisfactory filling of the order. The general and broad purpose of the present apparatus and method is to divert from the flow of sheets sheared from strip all those sheets which are outside of the tolerance limits of the particular order. Therefore, at the first deflecting station, sheets which are over-gage that is, more than .011 inch and consequently which are over-weight are deflected from the normal path of travel of the sheets onto the conveyor belt 54 and hence to discharge either as one pile or as further classified piles. Similarly, at the second deflecting station all those sheets which are undergage, that is, less than .010 inch in thickness and consequently which are light are deflected from the normal path of travel of the sheets onto conveyor belt 79 so that only the so-called "O. K." sheets, that is, sheets between .010 inch and .011 inch are allowed to travel the full length of the conveyor system and to be discharged at the stagger-piler end. In this way an order can be conveniently filled in an accurate and efficient manner so that the order will meet requirements and will not be subject to rejection. The diverted sheets whether they be extra heavy, heavy, light or extra light, are likewise classified and put into stock so that orders calling for sheets within the limits of the classification can be filled merely from stock on hand.

In operation, the strip of material 1 is threaded through the "Electrolimit" gage 16 and through the roll stand 25 until it projects into the throat 29, 30. Then the roll stand is set into operation and the strip is fed to the shearing device 46 where it is sheared into sheets, which sheets are carried by the common conveyor section 35 and classified as aforesaid. Contrary to those attempts which have been directed to the classification of already sheared sheets, it will be apparent that by my present invention I automatically and continuously gage the strip before it is sheared into sheets. The movable gage roll 18 of the gaging device suitably initiates the operation of the electrical circuit which controls in timed manner the solenoids 73, 73a and hence the V's 68 at the deflector stations 52. If the sheets, as gaged, are within tolerance limits of the order the sheets follow along the upper conveyor belts 82, 82, 83 to the stagger-piler end of the apparatus. Whenever, however, a thicker portion of the strip passes through the gage, it sets the electrical system into delayed operation in such manner, depending also upon the speed of travel of the strip which is itself variable and which further controls all timed relationships present in the apparatus, that at the instant when the over-gage portion is about to reach the first deflecting station, the deflector is caused to flop up, thus diverting the sheets which are too heavy, as above described, and this continues as long as over-gage material is passing through the gage.

When the material reverts to a gage within tolerance limits the deflector is caused to assume its normal position for "O. K." sheets. Sheets which are too light, as automatically gaged, pass the first deflector station without the position of the deflector thereat having been altered but when these under-gage sheets reach the second deflecting station, the circuit is so timed that at the right instant the deflector at the second deflecting station is flopped up thus diverting under-gage sheets as above described. The gage, therefore, first electrically classifies the unsheared strip and then at the proper timed intervals brings about mechanical alterations in the apparatus at the deflecting stations to bring about a mechanical classification corresponding precisely with the electrical classification. In this manner, entirely automatically, except for the initial threading of the strip into the apparatus, the material is electrically gaged prior to shearing it into sheets, the strip is sheared into sheets, the sheets are passed onto a common conveyor section, and is then mechanically classified after shearing in strict accordance with the electrical classification made by the gage device before shearing. Tests have shown that sheets can be classified without error in this manner within exceedingly small tolerance limits so that unusually fine and accurate classification can be rapidly and automatically secured. The whole arrangement is, of course, adjustable not only as to speed, in which respects I have been able to classify sheets much more rapidly than anything heretofore possible of accomplishment in this connection without loss of accuracy but also as to any desired gage for the "O. K." sheets.

Figure 14:
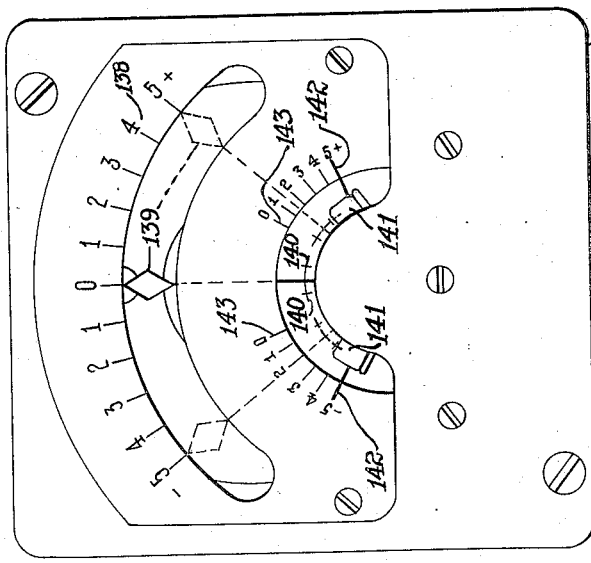
Fig. 14 illustrates in front elevation a microammeter indicating gage.

This adjustment is efficaciously made possible by means of the microammeter indicating gage 137 illustrated in Fig. 14. The microammeter indicating gage 137, in addition to a recording device appropriately associated therewith for permanently recording gage variations in the form of a chart or graph, is provided with a zero center scale 138 whereon a zero reading indicates correct gage and plus and minus readings respectively indicate over and under gage. Indicating pointer 139 shows the relative gage of the strip in the gaging device. Near its lower end, pointer 139 has two wire contacts 140, 140, which, when pointer 139 sufficiently shifts its position, project into adjustable mercury contact cups 141, 141. Mercury contact cups 141 are previously set, being movable by a suitable screw, to the appropriate position as indicated by their pointers 142 on auxiliary scales 143. Accordingly, when pointer 139 exceeds tolerance limits of the gage 137, as set, contact is made with one of contact cups 141 and the electrical circuit is connected and completed thus carrying out the operations above described.

Considering now the electrical circuit shown in Fig. 1 as associated with "Electrolimit" gage 16 and temporarily leaving out of consideration microammeter No. 2 and thyratron control panel No. 2 it will be seen that relative variation in the positions of the gaging rolls of gage 16 appropriately affects coil or coils 144 which act electrically through a power pack 145. This power pack contains in suitable relationship a rectifier, an input transformer, a resistor therefor and a differential transformer. The power pack 145 is electrically connected to a first microammeter indicating gage 137 as shown. The positive and negative sides of this microammeter indicating gage are connected to a resistor or potentiometer 146 which in turn at its ends is connected to the two thyratron tubes 147 and 148. As shown, each thyratron tube has a circuit which contains suitable resistors 149 and condensers 150. Thyratron tube 147 acts as a sensitive control relay for that deflecting station 52 which diverts light or undergage sheets to a separate point of discharge. Similarly thyratron tube 148 controls that deflector station 52 which diverts heavy or overgage sheets to a separate discharge point.

As shown at the left of the thyratron control panel No. 1 the circuits utilize current of 110 volts and 60 cycles. The thyratron tubes are also connected through coils or relays 151 and 152 to magnetically controlled multi-polar switches 153 and 154 which are connected to the current line as shown through suitable coils, of which 155 indicates a coil which acts for diverting heavy or overgage sheets to their proper path at a deflecting station by suitably controlling the solenoid thereat; and the numeral 156 indicates a coil for diverting light sheets to their proper path of travel. Where I use a system of cross conveyors as illustrated in Figs. 1 and 2 and as above described, I provide a second microammeter indicating gage 137a connected to power pack 145 through a resistor 157 and a separate thyratron control panel which, except as will be observed from Fig. 1, is understood to have the same electrical connections as control panel No. 1. Thyratron tube 158 acts through coil or relay 159 to control the path of travel of extra light sheets. In similar fashion thyratron tube 160 controls the path of travel of extra heavy sheets and acts through coil 161. In such case also the understood connections (not shown) are utilized. The numeral 162 represents the coil or relay for controlling the forward movement of the heavy cross conveyor when heavy sheets are being handled and the coil or relay 163 controls the reversing of the heavy cross conveyor for handling extra heavy sheets. Numeral 164 indicates the forward coil or relay for the light cross conveyor to handle light sheets and numeral 165 indicates the reversing coil or relay for the light cross conveyor for handling extra light sheets. Microammeter indicating gage No. 2 may be constructed on a different scale from the microammeter indicating gage No. 1 as schematically indicated in Fig. 1 for reasons which will be understood.

The elementary wiring diagram of Fig. 3 shows a suitable circuit delineated in a more general manner for use in connection with the present invention as to the classifying features thereof. Current of 220 volts and 25 cycles enters the circuit when the switch 166 is closed. Fuses 167 are provided adjacent the switch for the usual reasons. Current enters through input transformer 168 and differential transformer 169. 170 is a resistance cutout and 171 is an associated coil or relay having contacts 171a and 171b. The numeral 137 diagrammatically indicates a microammeter and it is apparent that upon the contacts thereof being suitably closed, one or the other of thyratron tubes 147 or 148 is connected. The balance of the thyratron tube circuits will be understood from what has preceded and particularly by a reference to Fig. 1. In the lower part of Figure 3 the conductors 200, 201 likewise are connected to switch 166 via fuses 167. Across these conductors, solenoids 202, 203 are disposed which are, respectively, like solenoids 73, 73a in that solenoid 202 causes diversion of overgage sheets and solenoid 203 causes diversion of undergage sheets. Four relays 204, 205, 206, 207 are also provided as shown associated with which are the copper oxide rectifiers having coils 208, 209, 210, 211. Relays 204 and 205 and rectifiers having coils 208 and 209 are for use in controlling light (under-gage) sheets while relays 206 and 207 and rectifiers having coils 210 and 211 are for use in controlling heavy (overgage) sheets. Relay 151 actuates contacts 151a; relay 152 actuates contacts 152a; relay 204 actuates 204a, 204b, 204c, 204d; relay 205 actuates contacts 205a; relay 206 actuates contacts 206a, 206b, 206c, 206d; and relay 207 actuates contacts 207a. Contacts 208a, 208b are actuated through a rectifier having a coil 208; contacts 209a are actuated through a rectifier having a coil 209; contacts 210a, 210b are actuated through a rectifier having a coil 210 and contacts 211a are actuated through a rectifier having a coil 211.

Figure 17:
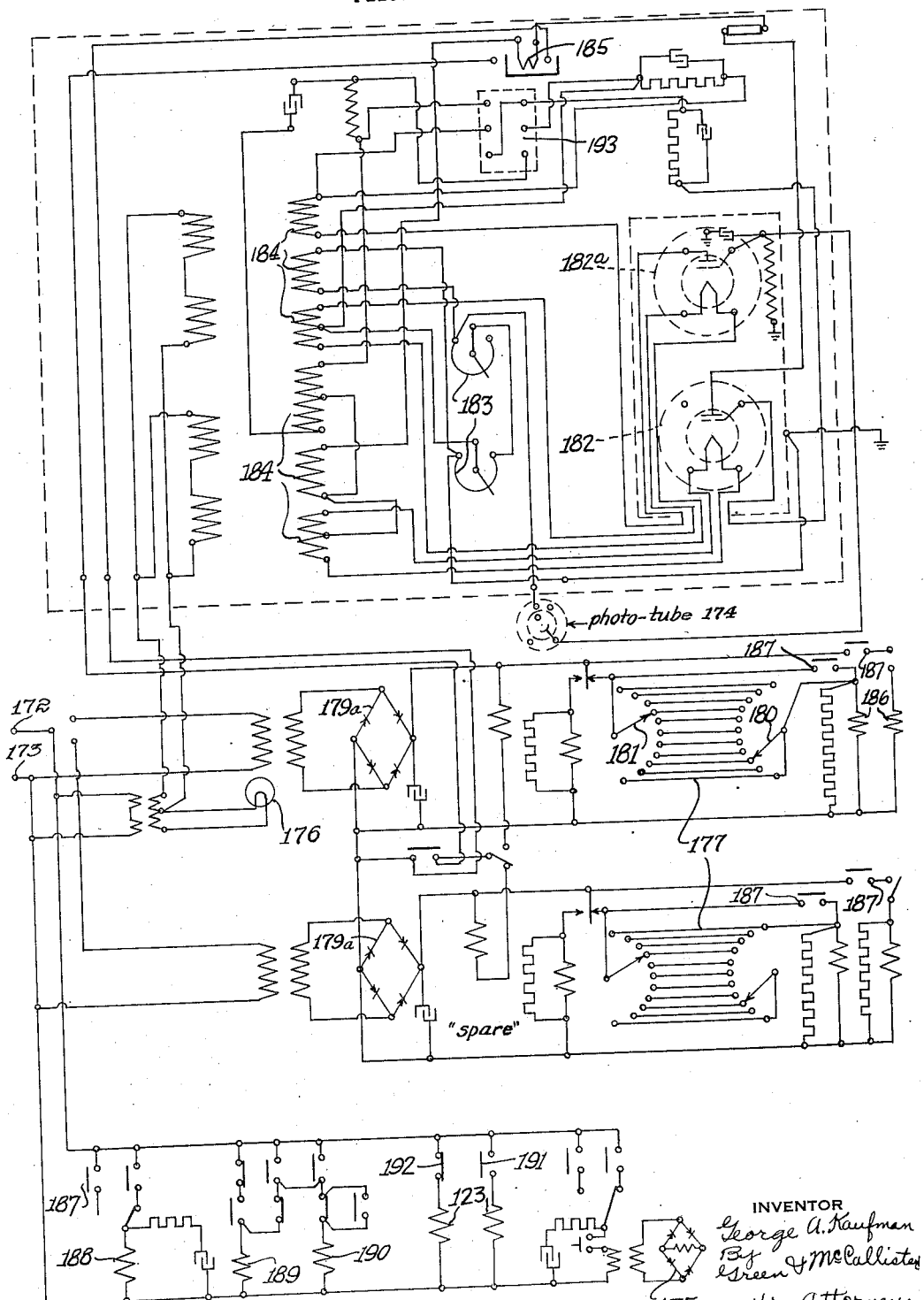
Fig. 17 represents an elementary electrical wiring diagram of the stagger-piler circuit in association with a photo-tube control circuit.

In Fig. 17 I have illustrated one electrical system for actuating and controlling the staggerpiler described above. Switch element 180 is preset to the desired contact on notched switch 177. Such switch usually is provided with ten (10) contacts and the preset position is usually on contact #8, although I am not restricted in either case as the same may be varied to suit circumstances or requirements.

As each sheet passes between light source 176 and phototube 174 the latter is energized and sets up a feeble electrical current of micro-volt proportions. Since such a current is itself too weak and hence unable to effect desired electrical operations, I amplify the same to suitable and useful proportions by means of suitable thyratron and pliotron tubes 182 and 182a, respectively. This is accomplished by passing the feeble current through potentiometers 183 and thence through any one or more of secondary transformers 184 which provide enough potential, acting through tubes 182, to actuate a relay 185. Each time a sheet passes between light source 176 and phototube 174, and hence each time relay 185 is actuated, switch element 181 is advanced one notch or contact. When element 181 has moved a number of times equal to the preset position of element 180, i. e., when both elements 180 and 181 are electrically connected, relay 186 is energized and sealed in around the switches by contacts 187. Relay 186, in turn, picks up relay 188 which picks up relay 189 provided relay 190 is de-energized. After relay 189 is picked up, relays 186 and 188 are dropped out and relay 190 is picked up and sealed in, breaking one seal in the circuit of relay 188 so that when relay 188 is again picked up, relay 189 is dropped out and then when relay 188 is dropped out, relay 190 drops out also. Then the equipment is reset for another cycle.

Solenoids 123 are alternately energized through the normally open and normally closed contacts 191 and 192, respectively. The numeral 175 indicates a magnetic counting device which may or may not be used, as desired or required. A suitable switch is provided for rendering the same either operative or inoperative. When operative each actuation of relay 185 causes actuation of 175 so that the total number of sheets is always known and indicated.

The current set up by photo-tube 174 is first amplified by pliotron tube 182a and then applied to the grid of thyratron tube 182. The amplified current trips the thyratron tube and starts current flowing to the coil of control relay 185. The potentiometers 183 are provided for adjusting the circuits for the proper values for the range of illumination change at which operation is desired or necessitated.

193 is a change-over switch for changing the circuits from operation on light increase to operation on light decrease, or vice versa.

This electrical circuit, therefore, consists primarily of electrical control means for alternately energizing the solenoids which in turn control the actuation of the mechanical fingers, in a preselective and pretimed relationship. The details shown and described will be clear to anyone skilled in the electrical arts.

Referring back to the circuits shown in Figs. 1 and 3, it will be apparent that with the strip 1 between the rolls of gage 16 and when the meters indicate gage within tolerance limits of the order the normal operation of the apparatus occurs and the sheets or plates which are within such tolerance limits are delivered by the conveyor system to an "O. K." pile which is at the stagger-piler end of the apparatus. These sheets or plates when delivered to the stagger-piler are received by the alternate sets of mechanical fingers in groups of sheets determined and controlled by the stagger-piler circuit and particularly in accordance with the pre-setting of the magnetic counting device so that groups of sheets each containing the predetermined number are alternately laid in stagger or offset relationship as above described.

Light source 176 (Figs. 13 and 17) is so located at the stagger piler apparatus that its light is received by photo-tube 174 either directly, in which case the light source may be placed so that the sheets pass between it and the photo-tube, or indirectly, in which case the light source is above or on a similar plane with photo-tube so that light is reflected from the sheets into the photo-tube. The former arrangement is preferable to the latter in most installations.

Assuming that the magnetic counter is set for 8 sheets to a group, each light ray received by photo-tube 174 causes the magnetic counter to advance one step until, when 8 such light rays fall upon photo-tube 174, the circuit is established. The same is true whatever number of sheets is desired in a group, the last step of the counter establishing contact and completing the circuit whereupon the above described operations of stagger piling occur. The stagger piler circuit is controlled by a suitable master switch. When such switch makes contact the stagger-piler goes into operation and when stagger piling is not required or desired the switch is left open or in "off" position whereupon the stagger-piler is inoperative. As shown in Fig. 17 the stagger-piler circuit is provided with suitable variable inductances 177 and with suitable resistances, relays, coils, condensers, switches, rectifiers and transformers all as will be understood from the preceding description. The photo-tube circuit in the upper half of Fig. 17 will likewise be clearly understood by those familiar therewith and it is believed that detailed explanation thereof is not required for an understanding of the present invention.

It is pointed out that elements 177 and their associated parts are shown in duplicate. This is not necessary to the proper operation of the stagger piler since one such element 177 and its circuit suffices. The other represents a "spare" which can be instantly "cut in" if needed when it is necessary or desirable to "cut out" the first. 179a indicates copper oxide rectifiers and the other features of the circuit require no explanation since they will either be understood by those familiar with electrical wiring diagrams or will be apparent from the present specification.

Upon an increase in the thickness of the strip 1, which is great enough to cause No. 1 meter to close the associated circuit at point 178, tube 148 causes current to pass to operate coil 152 which closes the contacts for operating the diverter solenoid for the heavy plate 155 and also to start up (when cross conveyors are used for further classification) the heavy plate cross conveyor belt forward coil 162. If the strip continues to increase in thickness enough to cause No. 2 meter to close the circuit at 179, thereupon the tube 160 causes current to pass to operate coil 161 which breaks contacts for running the heavy plate cross-conveyor belt forward and makes the contacts for reversing such conveyor belt. If still further classification is desired, as above pointed out, then additional meters Nos. 3 and 4, etc., could be similarly connected into the circuit so that continuing increases in thickness would operate such as just described in connection with microammeter No. 2, thus giving 7, 9 or more classifications as desired. Upon the strip in the gage becoming thinner than tolerance limits, similar operations take place to those just described except that they operate through the light and extra light control circuits and reverse the directions of the light plate cross-conveyor belts.

It will be clear to those skilled in this art that the gear ratio between roll stand 25 and flying shear 46 determines the length of the plates or sheets sheared from the strip. In any given case this gear ratio is suitably varied or determined so that plates or sheets of desired or required length are sheared. The classifying apparatus can be set or adjusted for any desired gauge of "O. K." sheets in any suitable way. I have found that this is probably best done by using appropriate ones of a set of "standard" blocks or sheets.

The above is intended more in an illustrative than in a limitative manner, it being clear that suitable variations, modifications, substitutions and/or omissions could be made without departing from the spirit and scope of the invention. Three, five, seven, nine or more classifications can be made and stagger piling can be carried out as to any or all of such. Any practical or suitable electrical circuits and/or control devices can be utilized so long as they enable the present apparatus to operate as described and so long as they efficiently make possible the carrying out of the present methods. The invention is rather to be measured by the subjoined claims wherein all terms are used in their broadest sense. In securing the time-delay or the time-controlled actuation of the deflectors through the circuits connected to the gage it is to be understood that such delay to the desired extent can be secured in any well known or suitable manner by various electrical devices familiar to those skilled in this art. Such delay may, for example, be secured through coils 155 and 156 or in any other appropriate portion of the circuits illustrated.

What I claim as new and desire to secure by Letters Patent is:

1. In an apparatus for classifying metal sheets as they are sheared from strip, means for continuously gaging a strip of metal as it is fed to the apparatus and before it is sheared, means for shearing the strip into sheets or plates and means for automatically distributing the sheared sheets or plates to a plurality of discharge stations according to their gage as determined in the strip.

2. In an apparatus of the kind described, means for continuously gaging a strip of metal as it is fed to the apparatus, means for shearing the strip into sheets or plates, and means for conveying each sheet or plate to one of a plurality of separate discharge points according to the gage of the sheets as determined in the strip, said last means being automatically controlled by the gaging means.

3. In an apparatus of the kind described, a gage in contact with and actuated by a strip of material fed to the apparatus, a flying shear for cutting the strip into sheets or plates and a multi-path conveyor provided with mechanical means for diverting the sheets or plates to various discharge points according to their strip gage characteristics, such mechanical means being automatically controlled by the gage aforesaid.

4. In an apparatus of the kind described, gaging means in contact with a strip of material as it is fed to the apparatus, shearing means for converting such strip into sheets or plates, a plurality of conveying means for diverting the sheets or plates into a plurality of stacks or piles according to their gage and means acting upon said conveyors and automatically actuated and controlled by said gaging means for causing the sheets or plates to follow the proper conveyor according to the strip gage characteristics of the sheets.

5. In combination, a flying micrometer, a flying shear, a multi-path conveyor, and an electrical system between said flying micrometer and said conveyor such that mechanical variations in the micrometer effect predetermined mechanical variations in the conveyor paths whereby strip material passing through said micrometer is, after shearing, automatically classified by said conveyor according to the strip gage characteristics thereof.

6. In combination, a micrometer, a system of conveyors and an electrical system connecting the micrometer and system of conveyors, said micrometer having gaging elements responsive to variations in gage of strip material passing through the gage, said conveyor having a plurality of stations, a deflecting means at each such station, and a plurality of possible paths of travel through said conveyor system according to the positions of such deflecting means, the electrical system being so constituted and arranged that variations in the relative positions of the gaging elements of the micrometer predeterminedly vary the positions of the deflectors to determine the path of travel of sheets produced from the material actuating the gaging elements.

7. In an apparatus of the kind described, means for continuously gaging a strip of material as it is fed to the apparatus, means for shearing the strip into sheets or plates, means for conveying the sheets or plates to a first station, means at the first station actuated and controlled in timed relation by the strip gaging means for diverting overgage sheets or plates to a separate discharge point, undiverted sheets or plates being conveyed to a second station, means at the second station actuated and controlled in timed relation by the strip gaging means for diverting undergage sheets or plates to a separate discharge point, and means for conveying sheets or plates undiverted at either station in a normal path to a separate discharge point.

8. In an apparatus of the kind described, means for continuously gaging a strip of material as it is fed to the apparatus, means for shearing the strip into sheets or plates, means for conveying the sheets or plates to a first station, means at the first station actuated and controlled in timed relation by the gaging means for diverting overgage sheets or plates to a separate discharge point, undiverted sheets or plates being conveyed to a second station, means at the second station actuated and controlled in timed relation by the gaging means for diverting undergage sheets or plates to a separate discharge point, and means for conveying sheets or plates undiverted at either station in a normal path to a separate discharge point, and an electrical system interconnecting said gaging means and both said diverting means whereby the gage characteristics of the material before shearing control the diverting means according to said timed relationship.

9. In an apparatus of the kind described, means for continuously gaging a strip of material as it is fed to the apparatus, means for shearing the strip into sheets or plates, means for conveying the sheets or plates to a first station, means at the first station actuated and controlled by the gaging means for diverting overgage sheets or plates to a separate discharge point, undiverted sheets or plates being conveyed to a second station, means at the second station actuated and controlled by the gaging means for diverting undergage sheets or plates to a separate discharge point, and means for conveying sheets or plates undiverted at either station in a normal path to a separate discharge point, each of said diverting means including a solenoid-controlled deflector.

10. In an apparatus of the kind described, means for continuously gaging a strip of material as it is fed to the apparatus, means for shearing the strip into sheets or plates, means for conveying the sheets or plates to a first station, means at the first station actuated and controlled by the gaging means for directing overgage sheets or plates to a separate discharge point, undiverted sheets or plates being conveyed to a second station, means at the second station actuated and controlled by the gaging means for diverting undergage sheets or plates to a separate discharge point, and means for conveying sheets or plates undiverted at either station in a normal path to a discharge point, said gaging means having gaging rolls responsive to variations in gage of the strip passing therethrough, variations in the positions of the rolls appropriately completing an electrical circuit, said diverting means comprising deflectors and associated solenoids, the solenoids being actuated in predetermined timed relation by the completion of such electrical circuit and hence changing the position of the deflectors for diverting purposes.

11. In an apparatus of the kind described, a conveyor, belts defining a normal path of travel along said conveyor for sheets within predeterminable tolerance limits, other belts defining additional paths of travel for sheets of abnormal characteristics, a common conveyor belt for feeding sheets to any of said paths of travel, means for causing sheets received by said common belt to follow any of the paths aforesaid, means associated with said conveyor for gaging the characteristics of a strip of material prior to its being sheared into sheets, means intermediate the gaging means and the conveyor for shearing the strip into sheets, and electrical means connecting said gaging means and said first-mentioned means for controlling the particular path of travel to be followed by said sheets according to the gage characteristics thereof as determined while in strip form.

12. In an apparatus of the kind described, a conveyor, belts defining a normal path of travel along said conveyor for sheets within predeterminable tolerance limits, other belts defining additional paths of travel for sheets beyond the desired tolerance limits, a common conveyor belt for feeding sheets to any of said paths of travel, means for causing sheets received by said common belt to follow any of the paths aforesaid, means associated with said conveyor for gaging the characteristics of a strip of material prior to its being sheared into sheets, means intermediate the gaging means and the conveyor for shearing the strip into sheets, and electrical means connecting said gaging means and said first-mentioned means for controlling the particular path of travel to be followed by said sheets according to the gage characteristics thereof as determined in the strip, said first-mentioned means comprising deflectors and solenoids, appropriate movements of the deflectors being effected by said solenoids which latter are controlled by said electrical means according to a timed relationship.

13. In an apparatus of the kind described, means for continuously gaging a strip of material as it is fed to the apparatus, means for establishing electrical circuits from gage variations due to thickness changes of said strip, means for delaying the effect of such electrical circuits according to a timed relationship, means for shearing the moving strip into sheets, means for conveying the sheets along a plurality of possible paths of travel, and means for diverting certain of said sheets to certain of said paths, said electrical circuits actuating and controlling said diverting means at the end of the period of delay.

14. In an apparatus of the kind described, means for automatically and continuously gaging strip material, means for shearing the strip into sheets, a first conveyor section for receiving the sheared sheets, a multi-path conveyor system disposed to receive sheets from said first conveyor section, means for causing sheets to follow a predetermined path through the conveyor system, and an electrical system between said gaging means and said path-determining means whereby variations imparted by the strip to the gaging means actuate and control said path-determining means.

15. In an apparatus of the kind described, means for automatically and continuously gaging strip material, means for shearing the strip into sheets, a first conveyor section for receiving the sheared sheets, a multi-path conveyor system disposed to receive sheets from said first conveyor section, means for causing sheets to follow a predetermined path through the conveyor system, and an electrical system between said gaging means and said path-determining means whereby variations imparted by the strip to the gaging means actuate and control said path-determining means, said gaging means being so constructed that electrical currents are set up in said electrical system upon predetermined changes in gage of said strip and said path-determining means including solenoid-controlled deflectors actuated by said currents in a timed relationship.

16. A conveyor system comprising a first conveyor section, a plurality of conveyors constructed and arranged to provide three possible paths therethrough, deflectors positioned to guide metal sheets to any one of the three paths, solenoids controlling the position of said deflectors, a gage for electrically transmitting changes in gage of a strip of metal passing therethrough to and for the purpose of controlling said deflectors in accordance with the gage of the strip, means intermediate the gage and conveyor system for shearing the strip into sheets, and an electrical circuit between the solenoids and the gage for causing undesirable gage variations in the strip to predeterminedly position the deflectors aforesaid so that the sheets automatically follow the proper path of travel in accordance with the gage thereof as determined while in strip form.

17. A method of classifying metal sheets as they are sheared from a metal strip which comprises continuously and automatically gaging such a strip, causing strip variations beyond predetermined adjustable tolerance limits to actuate deflectors at a time when the gaged strip portions, in the form of sheets, reach the appropriate deflector, shearing the strip into sheets and segregating the sheets into at least three groups of similar gage characteristics by deflecting heavy sheets and light sheets out of the normal path of travel of the sheets by means of deflectors actuated by the gage as aforesaid.

18. Apparatus for automatically shearing and classifying metal sheets from strip, comprising means for gaging the strip, means for impressing strip gage characteristics upon suitable electromagnetic circuits, means for shearing the strip into sheets, and time-controlled means for causing the electromagnetic circuits to discharge the sheets to separate piles in accordance with their strip gage characteristics.

19. Apparatus of the kind described comprising part defining a path of travel for metal sheets within predetermined gage limits, parts defining a second path of travel for overgage sheets, parts defining a third path of travel for undergage sheets, a shearing means for severing a strip into such sheets, a gage for gaging the strip prior to shearing it into sheets, and means, actuated by said gage, to determine which path of travel each sheet follows.

20. In an apparatus of the kind described, means for continuously gaging a strip of metal as it is fed to the apparatus, means for shearing the metal strip into sheets, means for conveying the sheets in a stream as sheared to a first station, means at the first station actuated and controlled by the gaging means for diverting from the stream of sheets those sheets beyond one of the tolerance limits of the particular sheets desired as "O. K." sheets, means for conveying undiverted sheets of such stream of sheets to a second station, means at the second station actuated and controlled by the gaging means for diverting from the stream of sheets those sheets beyond the other tolerance limit, means for conveying sheets undiverted at either station to a point of discharge, said gaging means being responsive to variations occurring in the strip of metal passing therethrough, variations outside of tolerance limits completing an electrical circuit which acts upon said diverting means in predetermined timed relation to effect the diversions aforesaid.

21. In an apparatus of the kind described, means for continuously gaging a strip of metal as it is fed to the apparatus and before it is sheared, means for shearing the metal strip into sheets without stopping the strip, means for conveying the sheets in a stream toward a discharge point, means for diverting from said stream of sheets those sheets which are outside of predetermined tolerance limits, only undiverted sheets continuing on to said discharge point, said sheet diverting means being automatically actuated according to a predetermined timed relation by said gaging means so that the sheared sheets are classified in accordance with the gage characteristics of the metal as determined while in its strip form prior to shearing.

22. An apparatus for classifying metal sheets as they are sheared from a strip comprising means for continuously and automatically gaging the thickness of such strip, means for shearing the strip into sheets, means for delivering the sheets as they are sheared to a sorting device and means for sorting the sheets in accordance with their gage as determined in the strip prior to shearing, said sorting device being electromagnetically connected to and controlled by said gaging means, an electrical system between said gaging means and sorting device, said electrical system being normally unenergized and adapted to be energized when portions of strip beyond predeterminable gage characteristics pass through said gaging means.

23. An apparatus for classifying metal sheets as they are sheared from strip without gaging the sheared sheets themselves, comprising means for continuously and automatically gaging the thickness of a strip of metal, means for impressing strip gage variations beyond predeterminable tolerance limits upon electro-magnetic circuits operatively associated with said gage, such variations themselves acting to energize such circuits, means for shearing the metal strip into sheets without stopping the strip and means for sorting the sheets in accordance with a predetermined classification scheme, said sorting means being actuated for sorting purposes by said electro-magnetic circuits, when energized, in such timed relationship that sorting is effected when sheets of varying gages corresponding to the gaged strip portions reach predetermined points of said sorting means.

24. An apparatus for classifying metal sheets in accordance with their gage as determined while in strip form prior to shearing comprising a gaging device for continuously and automatically gaging the thickness characteristics of a strip of metal, means for visually indicating the thickness characteristics of the strip as it passes through the gaging device, means associated with said indicating means for causing strip gage variations beyond predetermined adjustable limits to temporarily close electrical contacts, an electromagnetic circuit associated with said indicating means and established by the closing of said contacts, a solenoid-controlled sheet-sorting device electrically connected to and actuated by the established electro-magnetic circuit, means for shearing the strip into sheets and means for conveying the sheets to the sorting device in such manner that the sheets reach specified points in said sorting device at the time when the sorting device is actuated by said circuit in accordance with the gage characteristics of each sheet as determined while in strip form.

25. In combination in an apparatus for classifying sheared metal sheets in accordance with their gage characteristics as determined in the form of strip prior to shearing, a gage for continuously and automatically gaging the thickness of a strip of metal and responsive to gage variations in such strip, means controlled by said gage for indicating the thickness characteristics throughout the length of the strip as it travels through the gage, relatively adjustable electrical contacts associated with said indicating means and adapted to be closed by the passage of strip through the gage having a thickness beyond predetermined tolerance limits, an electrical circuit associated with said contacts and established by the closing thereof, said circuit when established acting after a specified period of delay to determine the path of travel of the individual sheets through an associated sorting device, means to shear said strip into sheets and means to convey the sheared sheets to said sorting device during the said period of delay.

26. In combination in an apparatus of the kind described, means for feeding a strip of metal to such apparatus, a gage through which said strip passes and which is responsive to gage variations of said strip, means electrically associated with said gage for indicating gage variations of the strip as they influence said gage, means for automatically establishing an electrical circuit when material of excessive thickness passes through said gage, means for automatically establishing an electrical circuit when material of excessive thinness passes through said gage, means for causing the established electrical circuits to actuate and control a sorting device after predetermined time delays and means operative during the time delays for shearing the strip into sheets and for conveying the sheared sheets to the sorting device, the sheets reaching specified points of the sorting device for sorting purposes substantially at the time of expiration of the time delay periods.

27. In an apparatus of the kind described, means for continuously and automatically gaging a strip of metal as it is fed through the apparatus, means for shearing the metal strip into sheets, means for conveying the sheared sheets to a first sorting station, means at said first sorting station actuated and controlled by the gaging means for directing over-gage sheets to a separate discharge point, means for conveying to a second sorting station sheets undiverted at said first sorting station, means at the second sorting station actuated and controlled by the gaging means for diverting under-gage sheets to a separate discharge point and means for conveying sheets undiverted at either sorting station to a point of discharge, said gaging means having gaging elements responsive to variations in gage of the strip passing therethrough, relative variations in the positions of the gage elements beyond predetermined limits acting to complete an electrical circuit between said gage and said sorting stations, said sorting stations comprising deflectors and associated solenoids, the solenoids being actuated in predetermined timed relation by the completion of such electrical circuit and hence changing the position of the deflectors for sorting purposes.

28. In an apparatus of the kind described, means for continuously and automatically gaging a strip of metal as it is fed to the apparatus, means for shearing the metal strip into sheets, means for conveying the sheets in a stream as they are sheared to a first sorting station, means at the first sorting station electro-magnetically actuated and controlled by the gaging means for diverting from the stream of sheets those sheets which are thicker than the upper preset tolerance limit for sheets desired as "O. K." sheets, means for conveying undiverted sheets of such stream of sheets to a second sorting station, means at the second sorting station electro-magnetically actuated and controlled by the gaging means for diverting from the stream of sheets those sheets which are thinner than the lower preset tolerance limit for sheets desired as "O. K." sheets, means for conveying sheets undiverted at either sorting station to a point of discharge for "O. K." sheets, said gaging means being responsive to variations of all magnitudes occurring in the strip of metal passing therethrough, only variations which are beyond the tolerance limits desired for "O. K." sheets as above defined acting to complete an associated electrical circuit which acts upon said sorting means in predetermined timed relation to effect the sorting operations aforesaid.

29. A method of classifying metal sheets as they are sheared from a strip of metal and in accordance with gage variations occurring therein as determined while in strip form which comprises continuously and automatically gaging such a metal strip, causing strip variations of all magnitudes to be visually indicated, causing only those strip variations which are beyond predetermined adjustable tolerance limits to actuate an associated sorting device at a time when the gaged strip portions, in the form of sheets, reach the appropriate points in said sorting device, shearing the strip into sheets and conveying the sheared sheets to the sorting device at the time when the sorting device is actuated, said sheets being segregated into at least three groups having similar gage characteristics by diverting over-gage sheets and under-gage sheets into separate paths of travel in the sorting device.

30. A method of classifying metal sheets as they are sheared from a strip of metal and in accordance with gage variations occurring therein as determined while in strip form which comprises continuously and automatically gaging a strip of metal, causing gage variations above a predetermined limit to establish an associated electrical circuit which acts to cause diversion of such over-gage material in an associated sorting device at a time when such material, then in sheet form, reaches a specified point of said sorting device, causing gage variations below a predetermined limit to establish an associated electrical circuit which acts to cause diversion of such under-gage material in said associated sorting device at a time when such material, then in sheet form, reaches a specified point of said sorting device disestablishing such circuits as and when strip metal of circuit-establishing thickness characteristics travels beyond gage-influencing position and shearing said strip into sheets and conveying the sheared sheets to the specified points of said sorting device as and for the purposes aforesaid.

31. Apparatus for classifying metal sheets as they are sheared from strip which comprises a continuous automatic gaging device having relatively movable gaging elements responsive to variations in thickness of a strip of metal passing through such gage, an electromagnetic circuit responsive to said gaging elements and in which a feeble current is established by relative movement of such gaging elements beyond predetermined limits, means for amplifying such current, means for shearing the strip into sheets without stopping it, sorting means having solenoid-controlled diverters and time-delayed means associated with said amplifying means for actuating said diverters to effect classification of said sheets in accordance with their gage characteristics is determined while in strip form.

GEORGE A. KAUFMAN.

CERTIFICATE OF CORRECTION.

Patent No. 2,146,581.                    February 7, 1939.

GEORGE A. KAUFMAN.

It is hereby certified that error appears in the above numbered patent requiring correction as follows: In the grant and in the heading to the printed specification, residence of inventor, for "Beaver, Pennsylvania" read Aliquippa, Pennsylvania; page 4, second column, line 42, for the word "this" read thus; page 10, first column, line 13, claim 19, for "part" read parts; page 11, second column, line 62, claim 31, for the word "is" read as; and that the said Letters Patent should be read with this correction therein that the same may conform to the record of the case in the Patent Office.

Signed and sealed this 18th day of April, A. D. 1939.

Henry Van Arsdale (Seal)                    Acting Commissioner of Patents.